(12) United States Patent
Pasquero et al.

(10) Patent No.: US 10,037,139 B2
(45) Date of Patent: Jul. 31, 2018

(54) METHOD AND APPARATUS FOR WORD COMPLETION

(71) Applicant: BlackBerry Limited, Waterloo (CA)

(72) Inventors: Jerome Pasquero, Montreal (CA); Donald Somerset McCulloch McKenzie, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 1113 days.

(21) Appl. No.: 13/771,380

(22) Filed: Feb. 20, 2013

(65) Prior Publication Data

US 2014/0237411 A1    Aug. 21, 2014

(51) Int. Cl.
*G06F 3/0488* (2013.01)
*G06F 3/023* (2006.01)

(52) U.S. Cl.
CPC ........ *G06F 3/04886* (2013.01); *G06F 3/0237* (2013.01)

(58) Field of Classification Search
CPC .... G06F 3/04883; G06F 17/24; G06F 3/0219; G06F 3/0238; G06F 3/0233; G06F 3/04817; G06F 17/2264; G06F 17/2795; G06F 3/0237; G06T 11/60; G09G 2354/00
See application file for complete search history.

(56) References Cited

U.S. PATENT DOCUMENTS

| 5,442,547 | A | | 8/1995 | Kutsumi et al. |
| 5,761,689 | A | * | 6/1998 | Rayson ............... G06F 17/273 715/210 |
| 5,995,026 | A | * | 11/1999 | Sellers ............................ 341/34 |
| 6,223,059 | B1 | | 4/2001 | Haestrup |
| 7,802,184 | B1 | * | 9/2010 | Battilana ............... G06F 3/0236 715/256 |
| 8,185,841 | B2 | | 5/2012 | Rainisto |
| 2004/0095327 | A1 | | 5/2004 | Lo |
| 2005/0114770 | A1 | | 5/2005 | Sacher et al. |
| 2006/0265668 | A1 | * | 11/2006 | Rainisto ............... G06F 3/0236 715/816 |
| 2007/0046641 | A1 | * | 3/2007 | Lim ................... G06F 3/04886 345/173 |
| 2008/0091410 | A1 | | 4/2008 | Benson |
| 2008/0243736 | A1 | | 10/2008 | Rieman et al. |
| 2009/0113299 | A1 | | 4/2009 | Chung |
| 2009/0289898 | A1 | | 11/2009 | Perera |
| 2010/0225599 | A1 | | 9/2010 | Danielsson et al. |

(Continued)

OTHER PUBLICATIONS

Extended European Search Report from the European Patent Office for corresponding EP Application No. 13156024.5, dated Jul. 9, 2013 (6 pages).

(Continued)

*Primary Examiner* — Mandrita Brahmachari
(74) *Attorney, Agent, or Firm* — Fish & Richardson P.C.

(57) ABSTRACT

Methods and apparatuses are provided for improving character entry in an electronic device. User input of one or more characters is received via a capacitive physical keyboard. A second user input is then received indicating a desire to add or remove a word completion, such as a prefix or a suffix, to the first set of characters. Based on a generated list of word completion rules, the electronic device modifies the word based on the user input, and outputs the completed word for display.

18 Claims, 13 Drawing Sheets

(56) References Cited

U.S. PATENT DOCUMENTS

| | | | |
|---|---|---|---|
| 2010/0292984 A1* | 11/2010 | Huang | G06F 3/0236 |
| | | | 704/9 |
| 2011/0090151 A1 | 4/2011 | Huang et al. | |
| 2011/0184728 A1 | 7/2011 | Fux et al. | |
| 2011/0208512 A1 | 8/2011 | Gao | |
| 2011/0234601 A1* | 9/2011 | Yasuta et al. | 345/467 |
| 2012/0149477 A1 | 6/2012 | Park et al. | |

OTHER PUBLICATIONS

Office Action for European Application No. 13156024.5-1959 from the European Patent Office, dated May 23, 2014, pp. 1-4.
Communication Pursuant to Article 94(3) EPC issued in related European Application No. 13156024.5 dated Apr. 15, 2016.
Summons to Attend Oral Proceedings issued in European Application No. 13156024.5 dated Apr. 18, 2017.

* cited by examiner

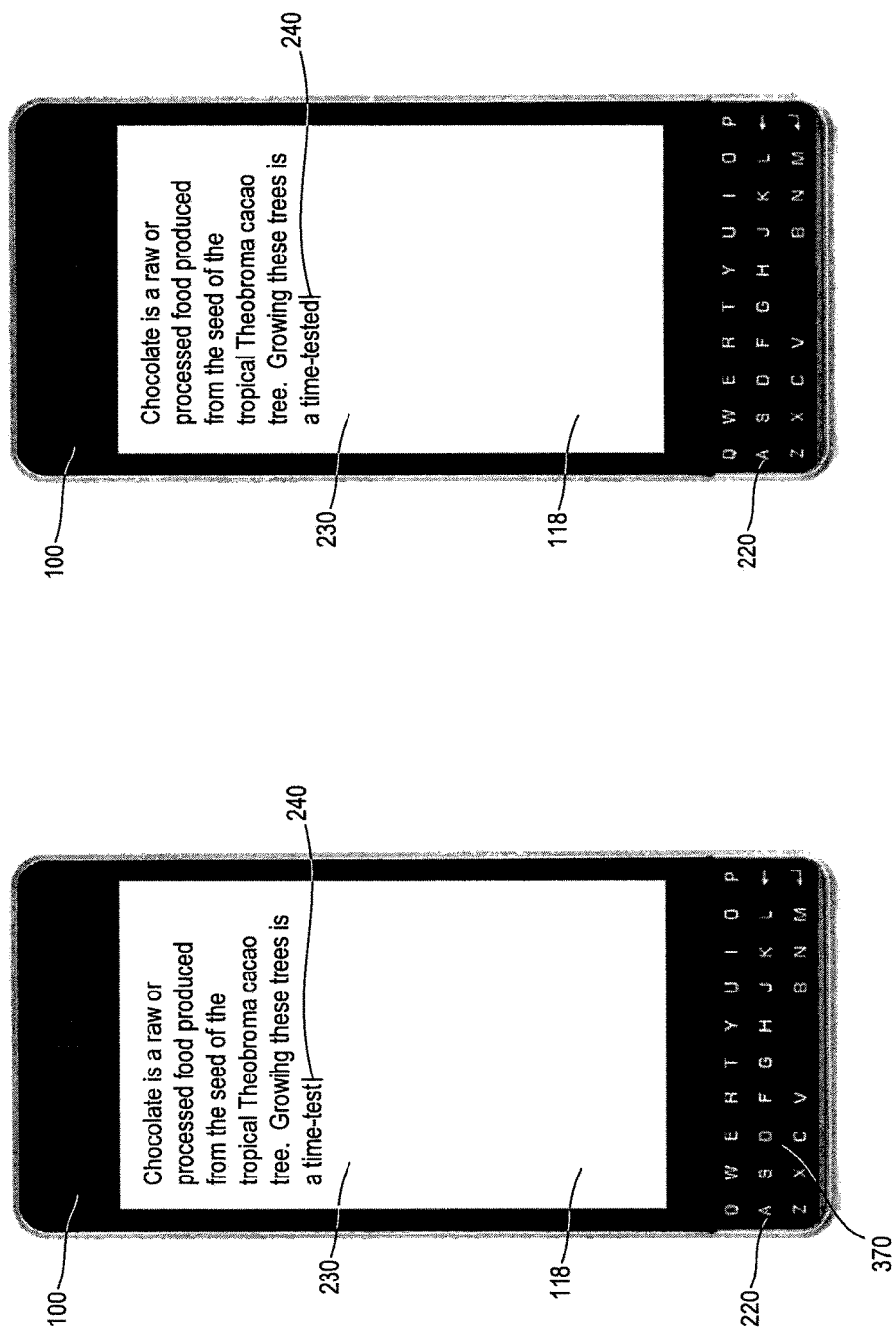

METHOD AND APPARATUS FOR WORD COMPLETION

FIELD

This application generally relates to input methodologies for electronic devices, such as handheld electronic devices, and more particularly, to methods for word completion during text input using the features of a keyboard.

BACKGROUND

Advances in technology permit electronic devices, such as computers, netbooks, cellular phones, smart phones, personal digital assistants, tablets, etc., to enter text increasingly quickly and on increasingly smaller devices and keyboards. Many users now demand and depend on these features. Nevertheless, further optimization of textual entry is required for rapid entry of words.

Accordingly, methods and apparatuses are provided to increase the speed of word entry by providing completion of words with one tap on a key.

BRIEF DESCRIPTION OF THE DRAWINGS

FIGS. 2A-2B, 3A-3B, 4A-4B, 5A-5B, and 6A-6F show examples of an electronic device, consistent with embodiments disclosed herein.

DETAILED DESCRIPTION

Figure 1:
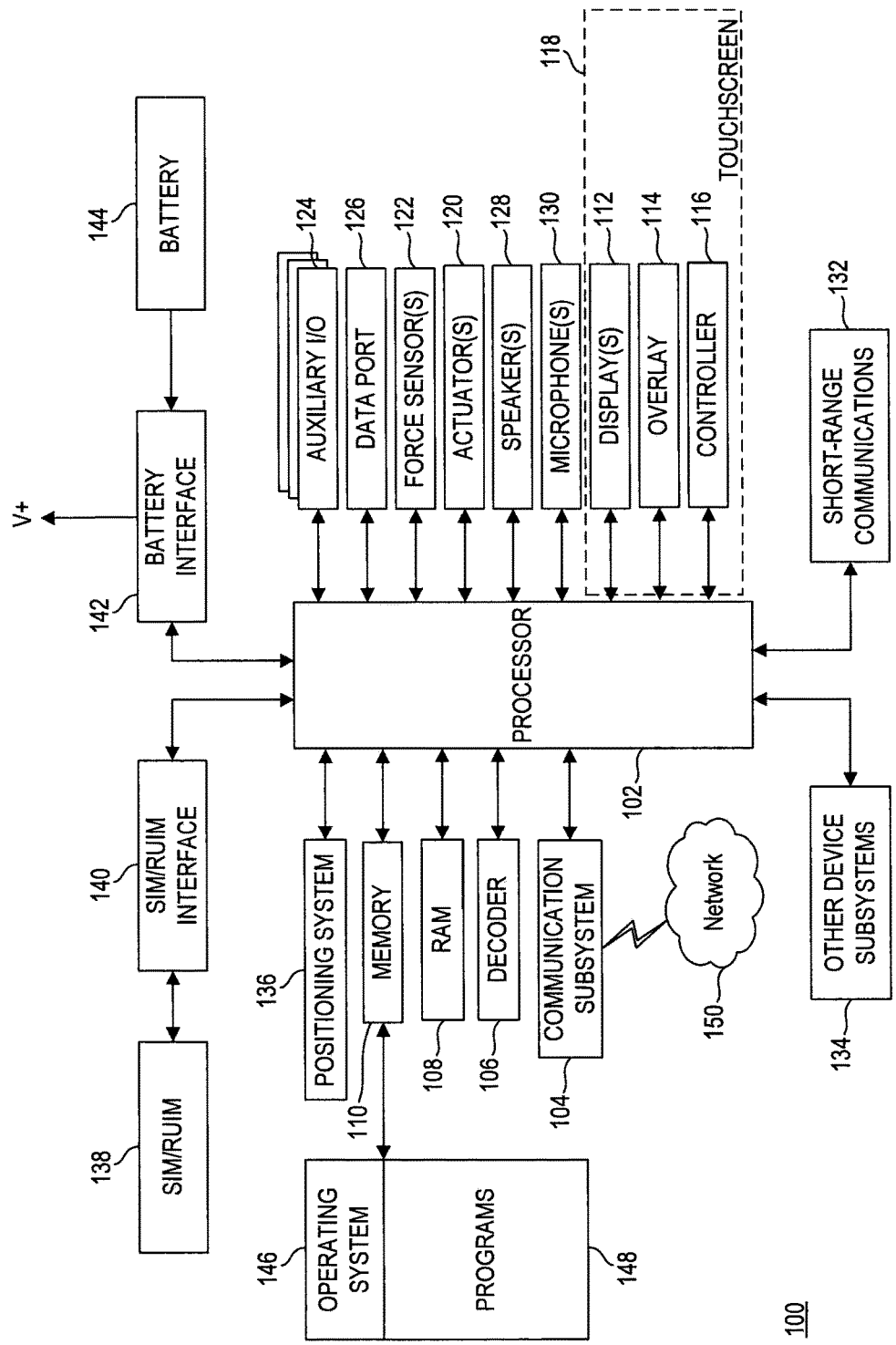
FIG. 1 is an example block diagram of an electronic device, consistent with embodiments disclosed herein.

Reference will now be made in detail to the disclosed example embodiments, examples of which are illustrated in the accompanying drawings. Wherever possible, the same reference numbers will be used throughout the drawings to refer to the same or like parts.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the," or "said," particularly after a feature has been introduced with the indefinite article, is meant to include one or more than one of the feature to which it refers (unless otherwise indicated). For example, the term "the generated set of characters" as used in "displaying the generated set of characters" includes displaying one or more generated set of characters. Directional references to graphical user interface (GUI) elements, such as top and bottom, are intended to be relative to a current screen orientation (which may be changed) rather than any physical orientation of the host device.

In one embodiment, a method is disclosed for operating an electronic device having a display and a keyboard. The method includes receiving a first user input of one or more characters via the keyboard, then receiving a second user input via the keyboard. Additionally, the method includes determining that the first and second inputs are both associated with a word completion rule, wherein the word completion rule is selected from a set of word completion rules and each word completion rule defines a variant associated with a particular user input. The method further includes modifying the one or more characters associated with the first user input in accordance with a particular user input. Further, the method includes displaying the modified characters on the display.

In another embodiment, an electronic device having a display and a keyboard is disclosed. The device further comprises a memory containing instructions, and one or more processors configured to execute the instructions. The one or more processors are configured to execute the instructions to receive a first user input of one or more characters via the keyboard, then receive a second user input via the keyboard. Additionally, the one or more processors are configured to determine that the first and second inputs are both associated with a word completion rule, wherein the word completion rule is selected from a set of word completion rules and each word completion rule defines a variant associated with a particular user input. The one or more processors are further configured to modify the one or more characters associated with the first user input in accordance with a particular user input. Further, the one or more processors are configured to display the modified characters on the display.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when, for example, a user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2B:
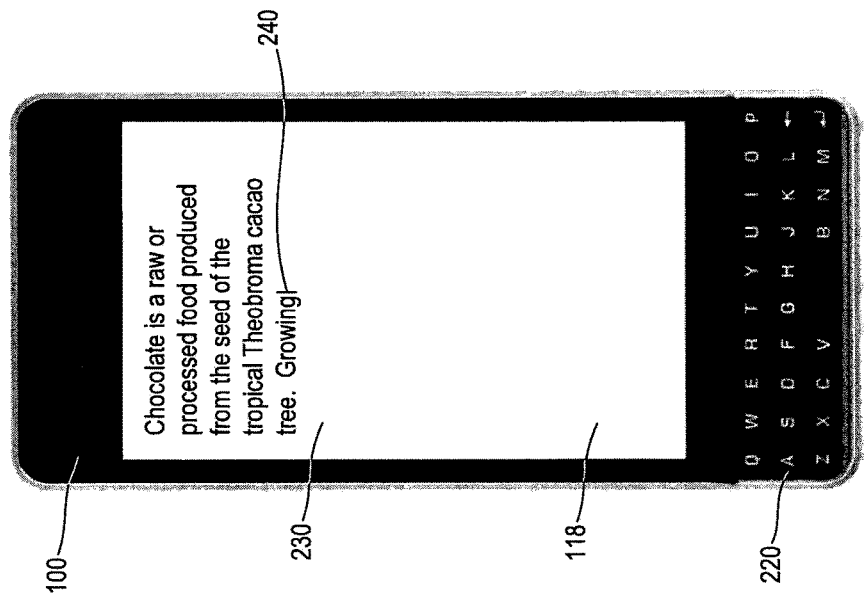
Figure 2A:
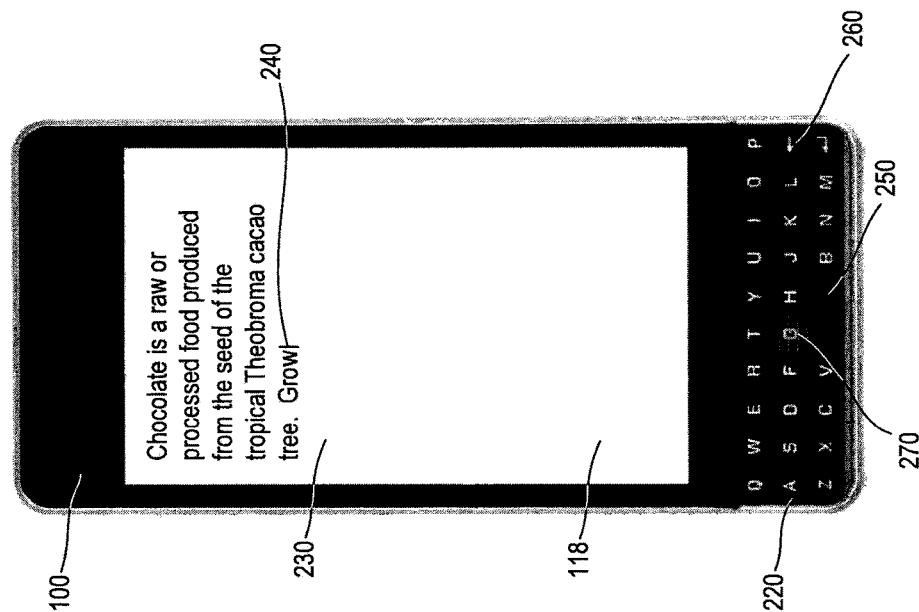

FIGS. 2A-2B illustrate examples of electronic device 100. For example, FIG. 2A illustrates a touchscreen 118 and a keyboard 220. In some embodiments, keyboard 220 is a capacitive physical keyboard, comprising a series of key covers overlaid on top of physical or electronic dome switches. Further, the capacitive physical keyboard contains actuators 120 and force sensors 122 that permit both tactile input via depression of the key covers on top of the actuators 120 and gesture input via force sensors 122. The input resolution of keyboard 220 is at least to the level of a single key; in other words, responsive to an input received via keyboard 220, processor 102 is capable of detecting which one of the plurality of keys of keyboard 220 was contacted. In some embodiments, an input received via keyboard 220 can be localized to precise coordinates in the X and Y directions on the keyboard via force sensors 122. Alternatively, keyboard 220 may be a virtual keyboard displayed on touchscreen 118.

As used herein, a "key press" input received by keyboard 220 means a depression of one of the plurality of keys associated with one of the actuators 120 for a duration exceeding 0.5 seconds that is sufficient to engage the physical or electronic dome switch associated with that key. In contrast, a "tap" input received by keyboard 220 means a touch input of one of the plurality of keys associated with one of the actuators 120 for a duration less than or equal to 0.5 seconds which does not engage the physical or electronic dome switch associated with that key. The input may be registered by one or more force sensors 122. Alternatively, in some embodiments keyboard 220 may be a virtual keyboard implemented with touchscreen 118, which, like a capacitive physical keyboard, is programmable to distinguish between different types of touch events like the key press and tap inputs described above. For example, the virtual keyboard may distinguish these types of events based on pressure sensed on touchscreen 118, or by measuring the duration of a touch event.

The position of the keyboard 220 is variable relative to touchscreen 118. The touchscreen 118 can be configured to detect the location and possibly pressure of one or more objects at the same time. The touchscreen 118 includes two input areas: (1) the keyboard 220, which includes a plurality of keys, each key corresponding to one or more different characters of a plurality of characters; and (2) a viewing pane 230 which displays a predetermined amount of text from a document under composition. In the example, the keyboard 220 is located below the viewing pane 230. Other locations for the input areas 320 and 330 are possible. For example, the keyboard 220 could be located at the top of the touchscreen 118, and the viewing pane 230 could be located below the keyboard 220. In yet other examples, the viewing pane 230 could be omitted.

The amount of text in viewing pane 230 from the document under composition may be limited to a predetermined number of lines of text, for example, 10 lines. The document under composition may be any type of document for any application which supports the keyboard 220, such as an email or other messaging application.

As shown in FIG. 2A, keyboard 220 is a standard QWERTY keyboard layout; however, any keyboard layout can be displayed for use in the device, such as AZERTY, QWERTZ, or a layout based on the International Telecommunication Union (ITU) standard (ITU E.161) having "ABC" on key 2, "DEF" on key 3, and so on. Keyboard 220 includes various keys that can provide different inputs, such as punctuation, letters, numbers, enter or return keys, and function keys. While keyboard 220 is shown as having a square shape, it can have any other shape (such as an oval).

As shown in FIG. 2A, electronic device 100 receives text input from keyboard 220. In this example, the device registers entry of the word stem "grow" and provides a shortcut for making the gerund "-ing" form of grow, growing. As represented by the translucent circle on the "G" key of keyboard 220 in FIG. 2A, keyboard 220 receives a "tap" input 270 on the "G" key. In FIG. 2B, electronic device 100 completes the word responsive to the tap on the "G" key by outputting the word completion candidate "growing" to the display 112 to the left of cursor 240. In some embodiments, the characters comprising the completion, in this example, "ing," may be presented in a different color (and possibly temporarily) to signal the user that a completion has been made. The user can accept the completion by pressing any key on keyboard 220, such as space bar 250, or can hit backspace key 260 to try a new word completion.

FIGS. 3A-3B illustrate further examples of electronic device 100. In FIG. 3A the word stem to be completed is "time-test." In this example, the device registers entry of the word stem "time-test" and provides a shortcut for making the "-ed" form of time-test, time-tested. Though used in this example in the context of an adjective, this completion could also be utilized to form the past tense of verbs. Keyboard 220 receives tap input 370 from the "D" key, and in FIG. 3B, the word completion candidate "time-tested" appears to the left of cursor 240.

Figure 4B:
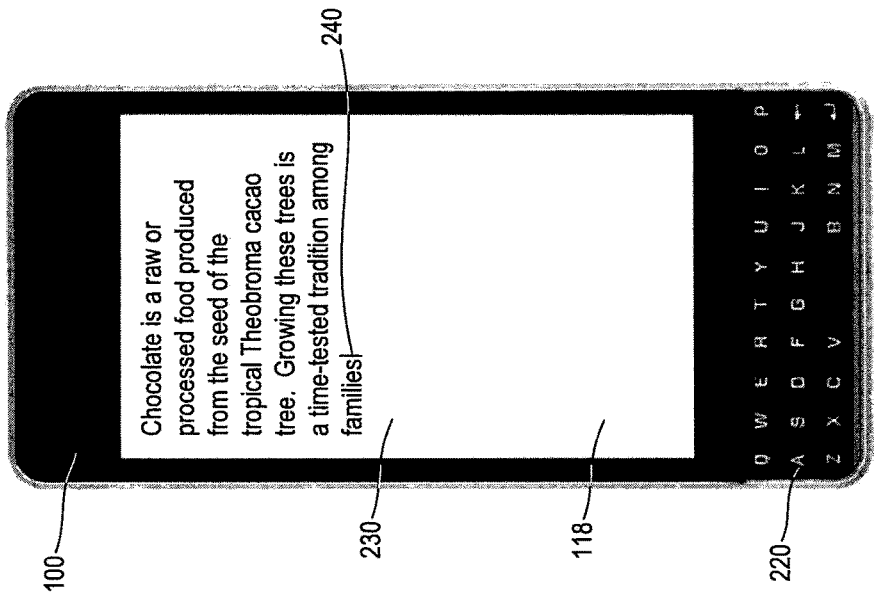
Figure 4A:
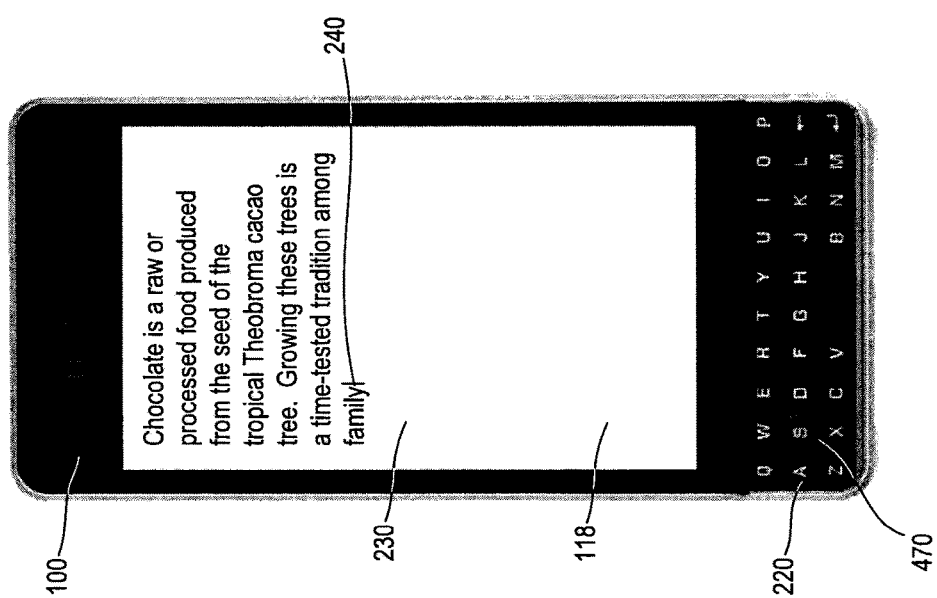

FIGS. 4A-4B illustrate further examples of electronic device 100, consistent with example embodiments disclosed herein. In some example embodiments, electronic device 100 must perform word completion on an irregular word completion stem. In FIG. 4A, the word stem to be completed is the word "family." In this example, the device registers entry of the word stem "family" and provides a shortcut for making the plural form of family, families. Keyboard 220 receives tap input 470 from the "S" key, and in FIG. 4B, the word completion candidate "families" appears to the left of cursor 240. In some embodiments, irregular word completions such as the example in FIG. 4B may be temporarily highlighted in a different color than a regular word completion, to signal that additional modifications of the word to fit English grammar rules were required. In another embodiment, the character "i" in "families" may be displayed in one color, and the characters "es" may be temporarily displayed in another color. This embodiment would demonstrate to the user that the word "family" was both modified and completed to meet English grammar rules.

Figure 5B:
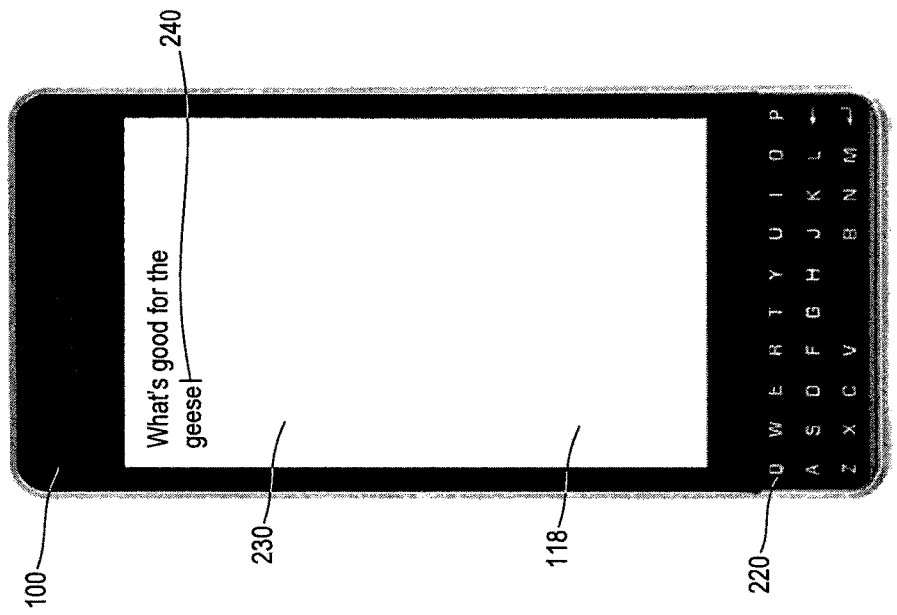
Figure 5A:
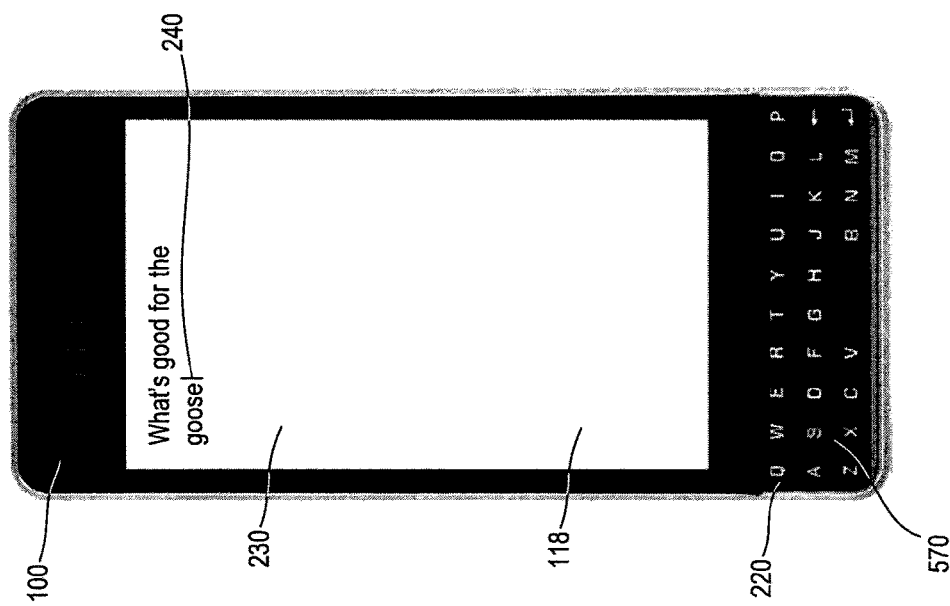

FIGS. 5A-5B illustrate further examples of electronic device 100, consistent with example embodiments disclosed herein. An example with a more irregular form of completion/modification is illustrated in FIGS. 5A-5B. In FIG. 5A, the word stem to be completed is the word "goose." In this example, the device registers entry of the word stem "goose" and provides a shortcut for making the plural form of goose, geese. Keyboard 220 receives tap input 570 from the "S" key, and in FIG. 5B, the word completion candidate "geese" appears to the left of cursor 240.

Figure 6B:
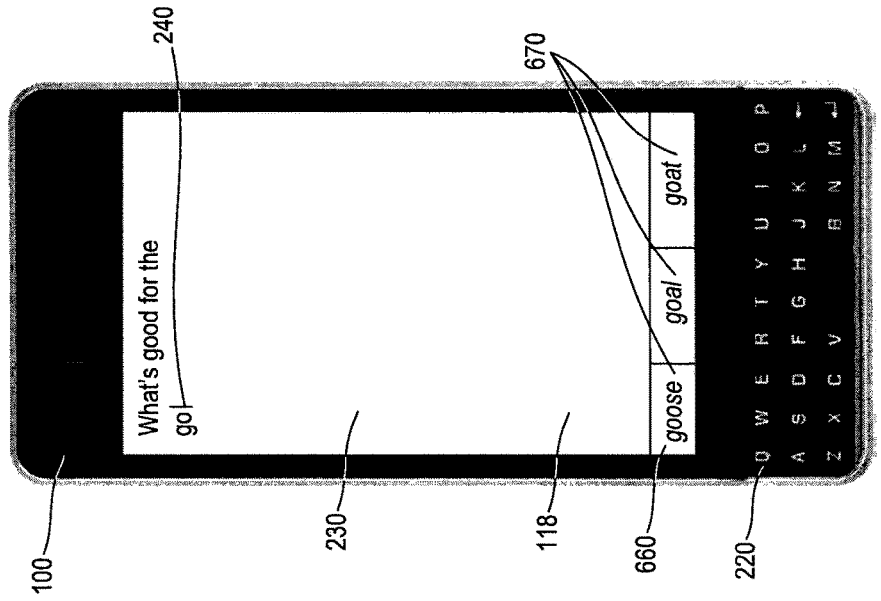
Figure 6A:
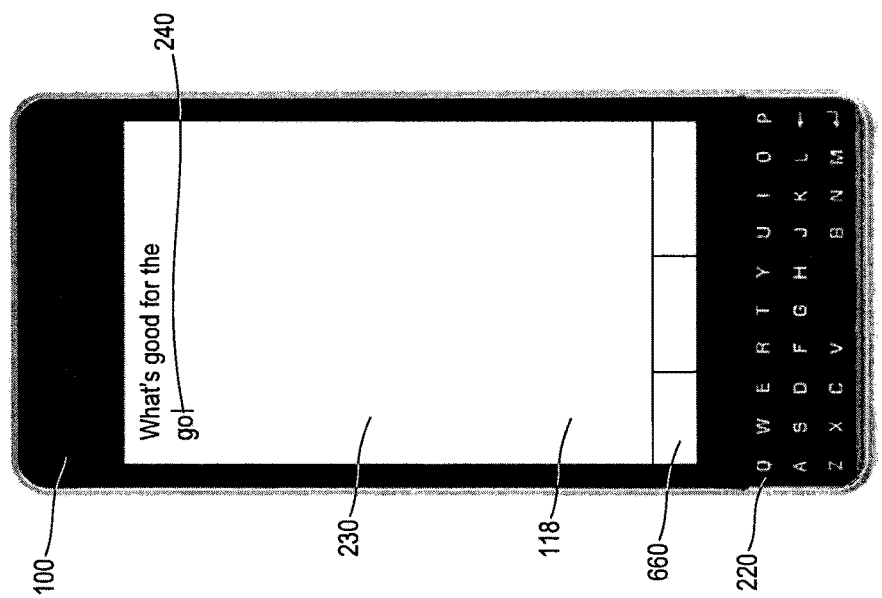

FIGS. 6A-6F illustrate further examples of electronic device 100, consistent with example embodiments disclosed herein. In FIG. 6A, electronic device 100 is receiving input via keyboard 220 of the same sentence previously seen in FIGS. 5A-5B, "What's good for the . . . ." As seen in FIG. 6A, in this embodiment, touchscreen 118 now contains a prediction ribbon 660, and viewing pane 230's size is accordingly reduced. In this example, the device registers entry of the word stem "go." In FIG. 6B, three word prediction candidates 670, "goose," "goal," and "goat" appear in prediction ribbon 660. In some embodiments, the prediction candidates 670 are generated via a prediction algorithm. The prediction algorithm may be based on a dictionary loaded into memory 112 of electronic device 100. The dictionary's ability to predict what word the user wishes to enter may be enhanced by known methods. As an example, in one embodiment, the prediction algorithm is enhanced with data about previous words entered by the user. In another embodiment, context clues may be employed to predict the word. In yet another embodiment, prediction candidates are generated based on collective data gathered from other users.

Figure 6C:
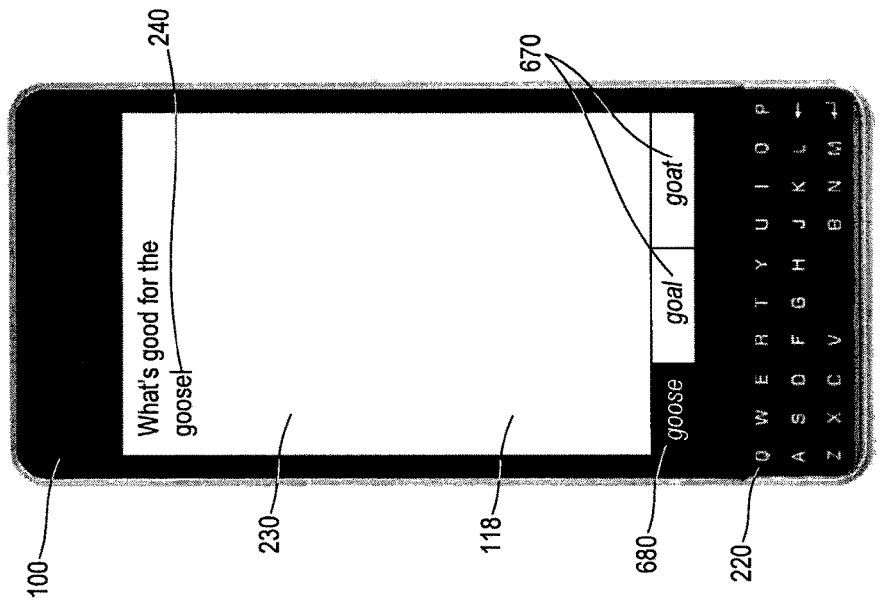

In this example, the desired word to be entered is "goose." In FIG. 6C, electronic device 100 receives an indication 680 that the user has selected prediction candidate 670 "goose" in prediction ribbon 660 for entry into viewing pane 230. In one embodiment, selection of a word prediction candidate may involve a touch input in the area of the prediction candidate within prediction ribbon 660 on touchscreen 118. In another embodiment, selection of a word prediction candidate may be indicated by a swipe gesture on keyboard 220. In another embodiment, selection of a word prediction candidate may involve scrolling with an arrow key or trackball device to select the word.

Figure 6D:
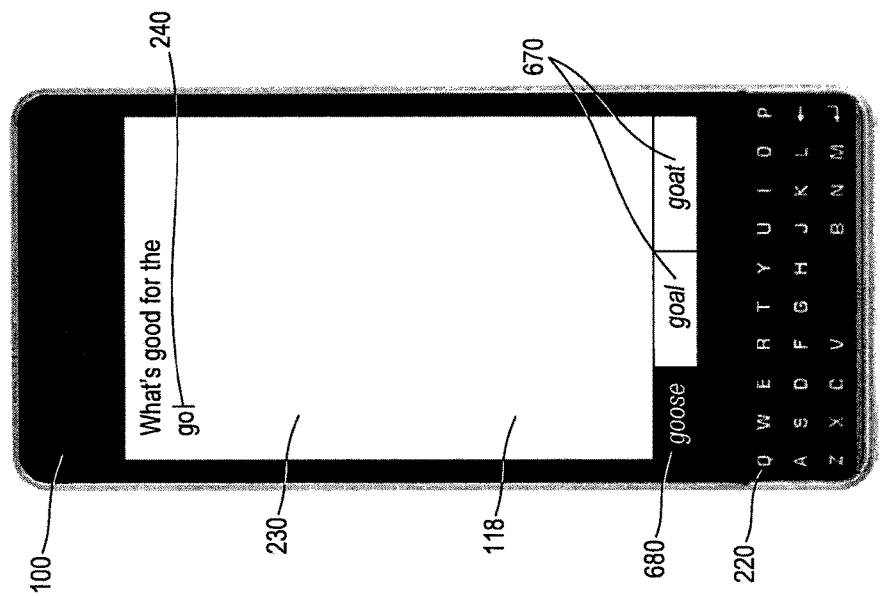

In FIG. 6D, the word prediction candidate is displayed within viewing pane 230. Device 100 may receive confirmation of selection of a word prediction candidate by various means. For example, keyboard 220 may receive a tap or press input from space bar 250, touchscreen 118 may receive a touch input, etc. In some embodiments, the word prediction candidate may be displayed immediately to the left of cursor 240, as shown in FIG. 6D. Alternatively, the word prediction candidate may be displayed in viewing pane 230 with an additional space added between the displayed selection and cursor 240, in order to aid rapid entry of words and sentences.

Figure 6F:
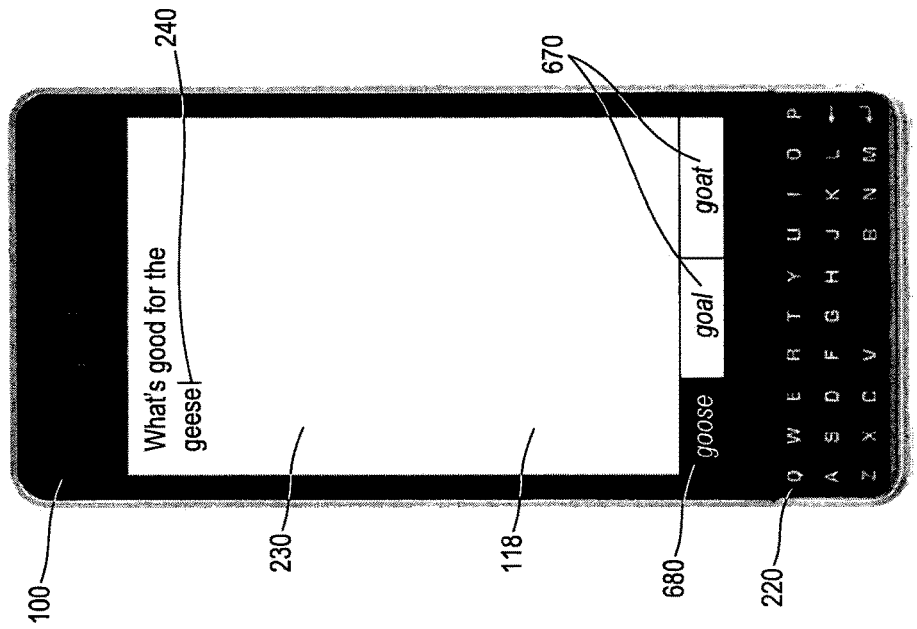
Figure 6E:
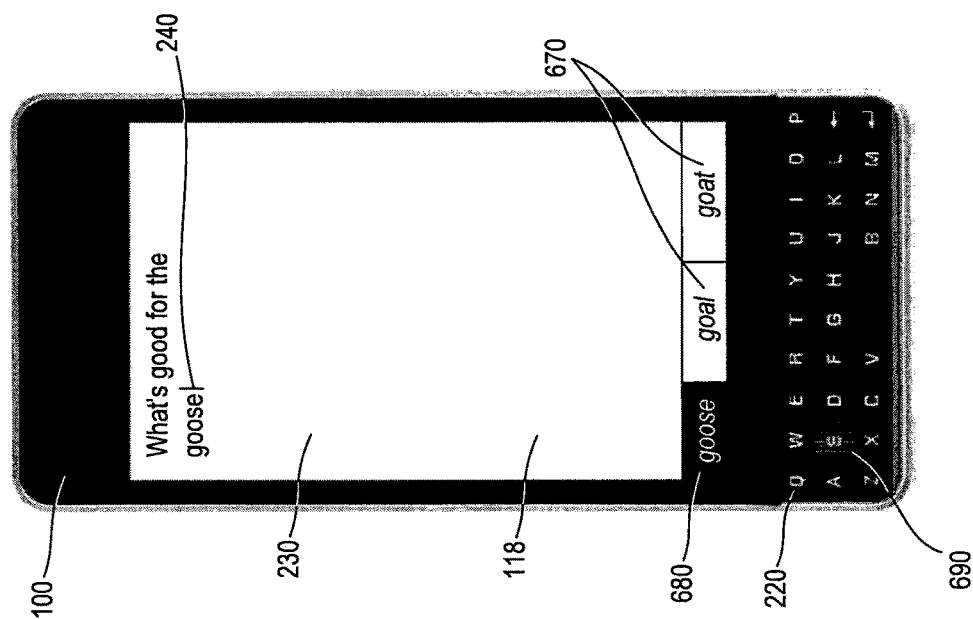

FIGS. 6E-6F are similar to FIGS. 5A-5B, with the addition of the prediction algorithm. As before, keyboard 220 receives tap input 690 from the "S" key, and electronic device 100 outputs "geese," the proper plural form of goose. These methods facilitate improved character entry via electronic device 100 by reducing the time needed to select and complete words suggested by prediction or disambiguation algorithms.

Figure 7:
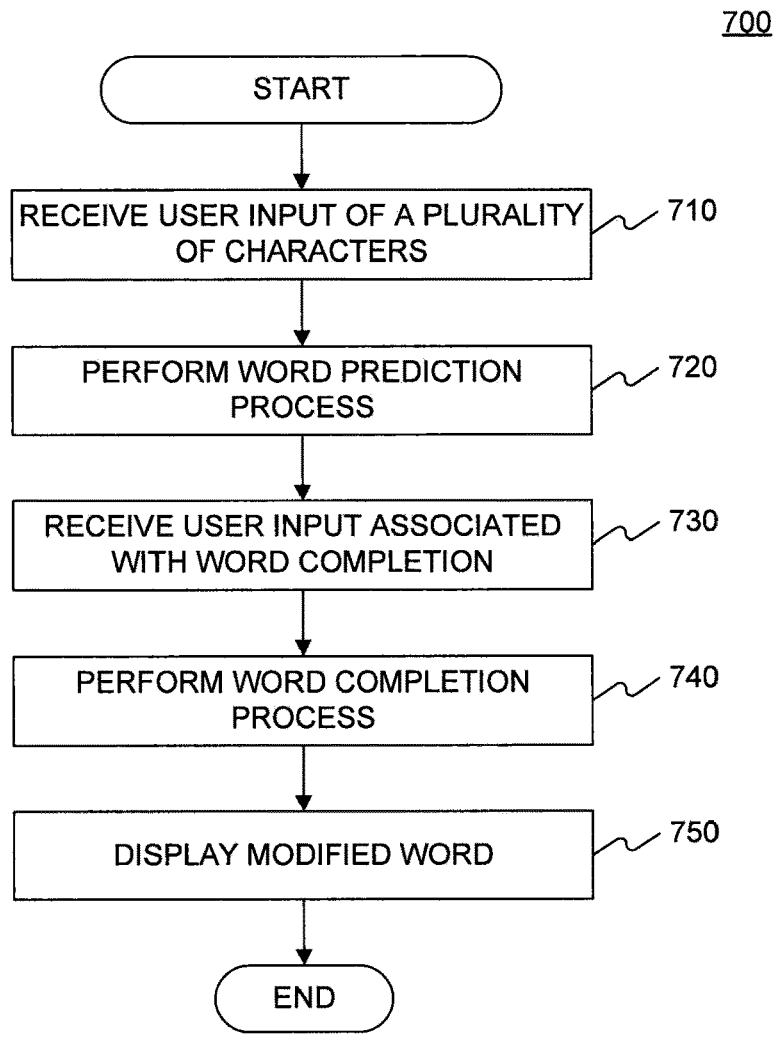
FIGS. 7-11 are flow charts showing example word completion processes, consistent with embodiments disclosed herein.

FIG. 7 is a flow chart showing a word completion and prediction process 700, consistent with example embodiments disclosed herein. Electronic device 100 receives text input via keyboard 220 of a plurality of characters (Step 710). Based on the inputted characters, electronic device 100 may perform a word prediction process (Step 720). In brief, electronic device 100 generates and displays a set of additional characters as candidates to complete words containing the characters input by the user in Step 710, or variations thereof. Responsive to further input by the user via keyboard 220, electronic device 100 displays a selected word candidate within viewing pane 230 for confirmation by the user.

Word prediction and completion process 700 proceeds with electronic device 100 receiving input via keyboard 220 (Step 730). Responsive to this input, electronic device 100 performs a word completion process (Step 740). In brief, electronic device 100 receives input via keyboard 220, determines the proper word completion based on a set of word completion rules, and responsive to the input, displays the proper form of the completed word. Electronic device 100 completes word prediction and completion process 700 by displaying the final word, after modification by both the prediction and completion processes (Step 750).

Figure 8:
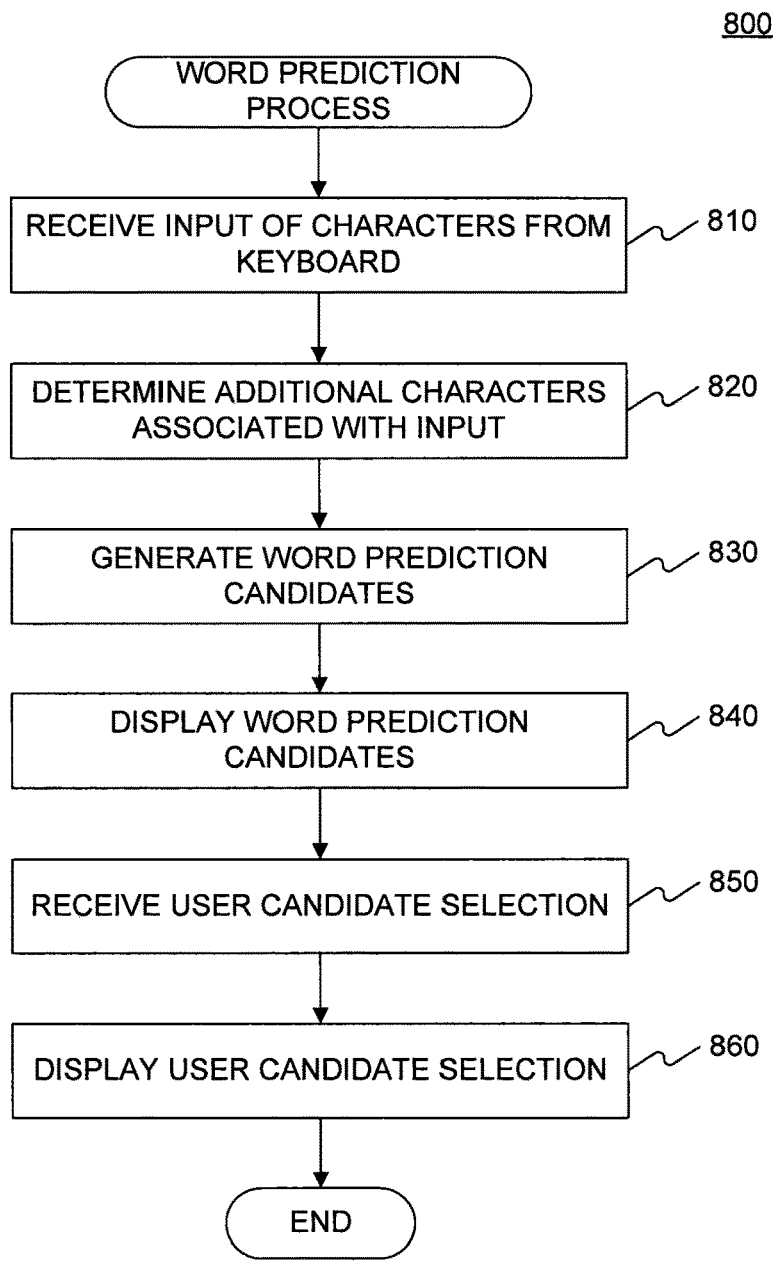

FIG. 8 is a flow chart showing a word prediction process 800, consistent with example embodiments disclosed herein. In one embodiment, electronic device 100 may receive input of one or more characters from keyboard 220 (Step 810). Electronic device 100, through processor 102 and memory 110, determines and predicts a set of additional characters associated with the input characters (Step 820). As discussed above in association with FIGS. 6A-6F, the set of additional associated characters may be determined based on prior inputs by the user, sentence context, or other known means.

Processor 102 generates a set of word prediction candidates based on the input characters and the set of other possible associated characters (Step 830). Electronic device 100 may bias the word prediction candidates based on various probabilities. In one embodiment, a word prediction candidate may alternatively have a higher probability of selection based on prior usage of the word by the user. In one embodiment, a word prediction candidate may alternatively have a higher probability of selection based on context clues within the typing task. In one embodiment, a word prediction candidate may alternatively have a higher probability of selection based on historical usage by other users of the language.

Electronic device 100 displays the generated word prediction candidates on a combination of display 112, touchscreen 118, and viewing pane 230 (Step 840). In some example embodiments, such as the example illustrated in FIGS. 6C-6D, the word prediction candidates are displayed in a ribbon or banner at the bottom of touchscreen 118 below viewing pane 230 and above keyboard 220. Prediction candidates may alternatively be displayed elsewhere, including on keyboard 220, in viewing pane 230, or at the top of touchscreen 118.

Via keyboard 220 electronic device 100 receives an indication that a user has selected one of the word prediction candidates for insertion into the text (Step 850). As described in conjunction with FIGS. 6A-6F, selection may occur in a variety of ways. In one embodiment, a user may indicate selection via a touch input on touchscreen 118. In one embodiment, a user may indicate selection via an arrow key or a trackball. In other embodiments, a user may indicate selection by other means, such as typing the next character in the prediction candidate, performing a gesture, etc. Responsive to the selection input by the user, electronic device 100 may insert the word prediction candidate into the text, and display the word within viewing pane 230 (Step 860).

Figure 9:
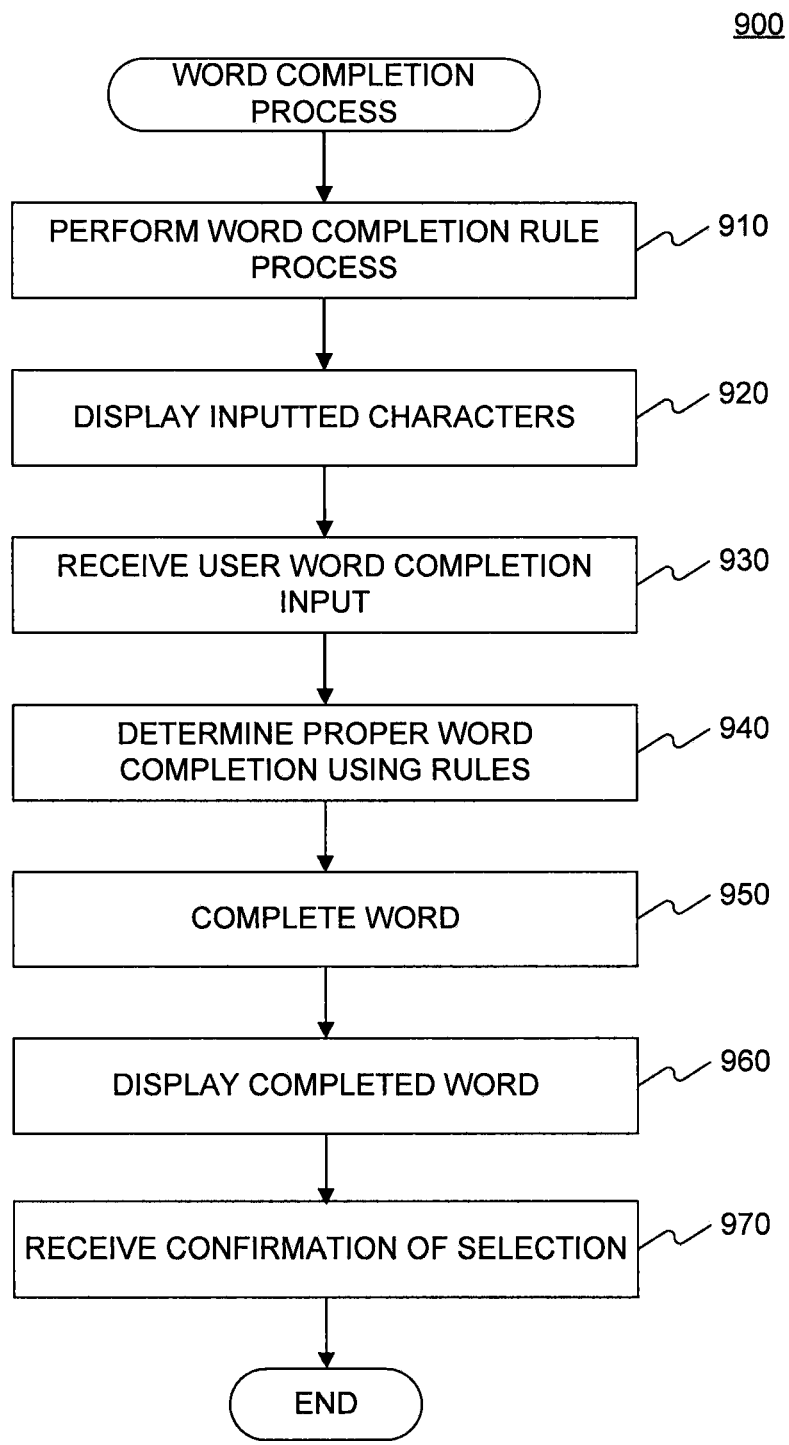

FIG. 9 is a flowchart showing a word completion process 900, consistent with example embodiments disclosed herein. Electronic device 100, via processor 102 and memory 110, performs a word completion rule process (Step 910). In brief, a list of word generation and grammar rules for the desired language is generated. The rule list is stored, and the processor of electronic device 100 is configured to apply the rules in word completion.

Electronic device 100 may display a plurality of inputted characters in one or more of display 112, touchscreen 118, or viewing pane 230 (Step 920). The inputted characters may be a selected word prediction candidate output from word prediction process 800, or they may be inputted independent of the word prediction process.

Via keyboard 220 electronic device 100 receives user input relating to word completion (Step 930). As previously described in conjunction with FIGS. 6A-6F and FIG. 7, the user input of Step 930 may be one of the "shortcuts" illustrated in FIGS. 2-6, such as "G," "D," or "S." This input prompts processor 102 to determine the proper word completion (Step 940), using the list of word completion rules generated during the word completion rule process of Step 910.

Upon determination and selection of the applicable word completion rule, processor 102 completes the word (Step 950), and displays the completed word to the user in display 112, touchscreen 118, or viewing pane 230 (Step 960). Electronic device 100 then receives confirmation of the word completion selection via an input from keyboard 220 (Step 970).

In one embodiment, the user input of Step 930 may modify the predicted word in the opposite manner. As an example, if the predicted word happens to be in plural form, and the user desires to input the singular form, electronic device 100 may receive the same input, in this case, "S," and modify the plural prediction candidate to a singular form. In other embodiments, similar "opposite operations" may be performed, for example, input of a "G" to a gerund form prediction to remove the "-ing" suffix, or input of a "D" to remove an "-ed" suffix.

Alternatively, word completion process 900 may also attach prefixes to words. For example, keyboard 220 may receive input associated with a word completion rule that adds a prefix to the beginning of the word. As an example, if a user has input the word "flammable," and then decides to form the word "inflammable," keyboard 220 may receive input comprising a tap on the key corresponding to the letter "I." As before, this input prompts processor 102 to determine the proper word completion (Step 940), in this case, a prefix, using the list of word completion rules generated during the word completion rule process of Step 910. The word is completed and displayed in Steps 950-970 as previously described. Other possible prefix-associated shortcuts receivable by keyboard 220 might include, for example, "U" for "un-," "A" for "a-," "B" for "ab-," "Y" for "dys-," etc.

Figure 10:
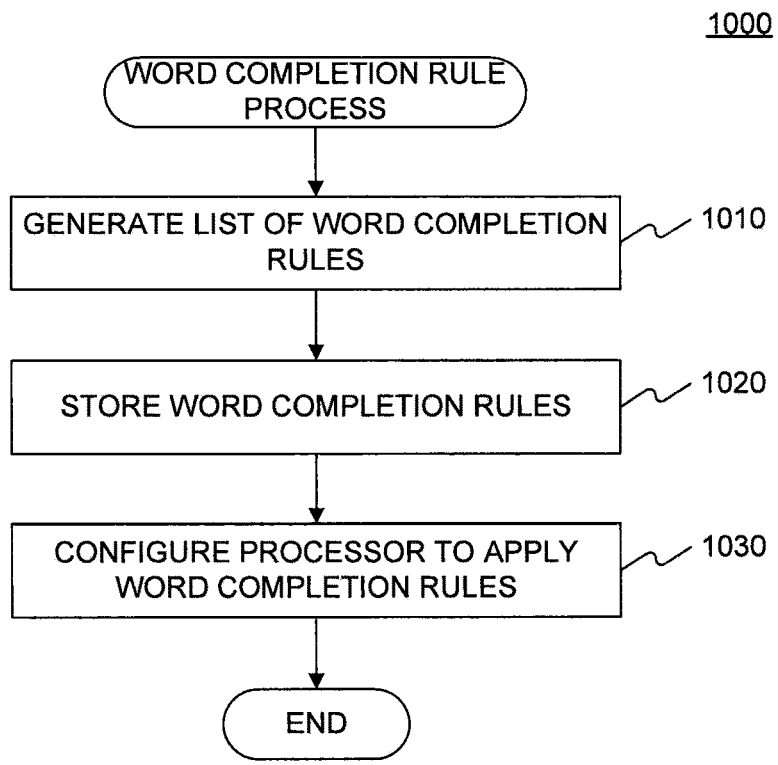

FIG. 10 is a flow chart showing a word completion rule process 1000, consistent with example embodiments disclosed herein. As described previously, in Step 910 of word completion process 900, a word completion rule process is performed. To begin the process, a list of word completion rules is generated (Step 1010). This list may be compiled by the manufacturer of electronic device 100, or an external party. In some embodiments, the word completion rule list may serve as an add-on module for the predictive dictionary, such as that used in word prediction process 800. For a plurality of words in a desired language set, word completion rules are defined, setting forth, as an example, various verb conjugations, alternative forms, plural forms, gerund forms, etc. for each word in the dictionary. Each word completion rule defines a variant form of the word or set of characters associated with a particular user input.

Once the list of word completion rules is generated, it is stored for access by electronic device 100 and processor 102 (Step 1020). The list may be stored locally in memory 110 of electronic device 100, or it may be stored remotely, for example, on an external file server or hard drive accessible via communication subsystem 104 and network 150. In some embodiments, the list of word completion rules may be updated periodically to correct errors or add new words. This update may be performed locally, or via communication subsystem 104 and network 150.

Processor 102 is configured to apply the word completion rules (Step 1030). As part of the configuration, processor 102 recognizes, responsive to input of a given set of textual characters, that a word is input. As the word is being input via keyboard 220, processor 102 may perform, for example, word prediction process 800. If a user input via keyboard 220 associated with word completion is received, such as tapping of particular keys such as "G," "D," or "S," processor 102 may be configured to find the input word in the word completion rule list, determine the proper word completion based on the input of the user and the applicable rule, modify the word, and present it for confirmation to the user, as detailed in word completion process 900.

Figure 11:
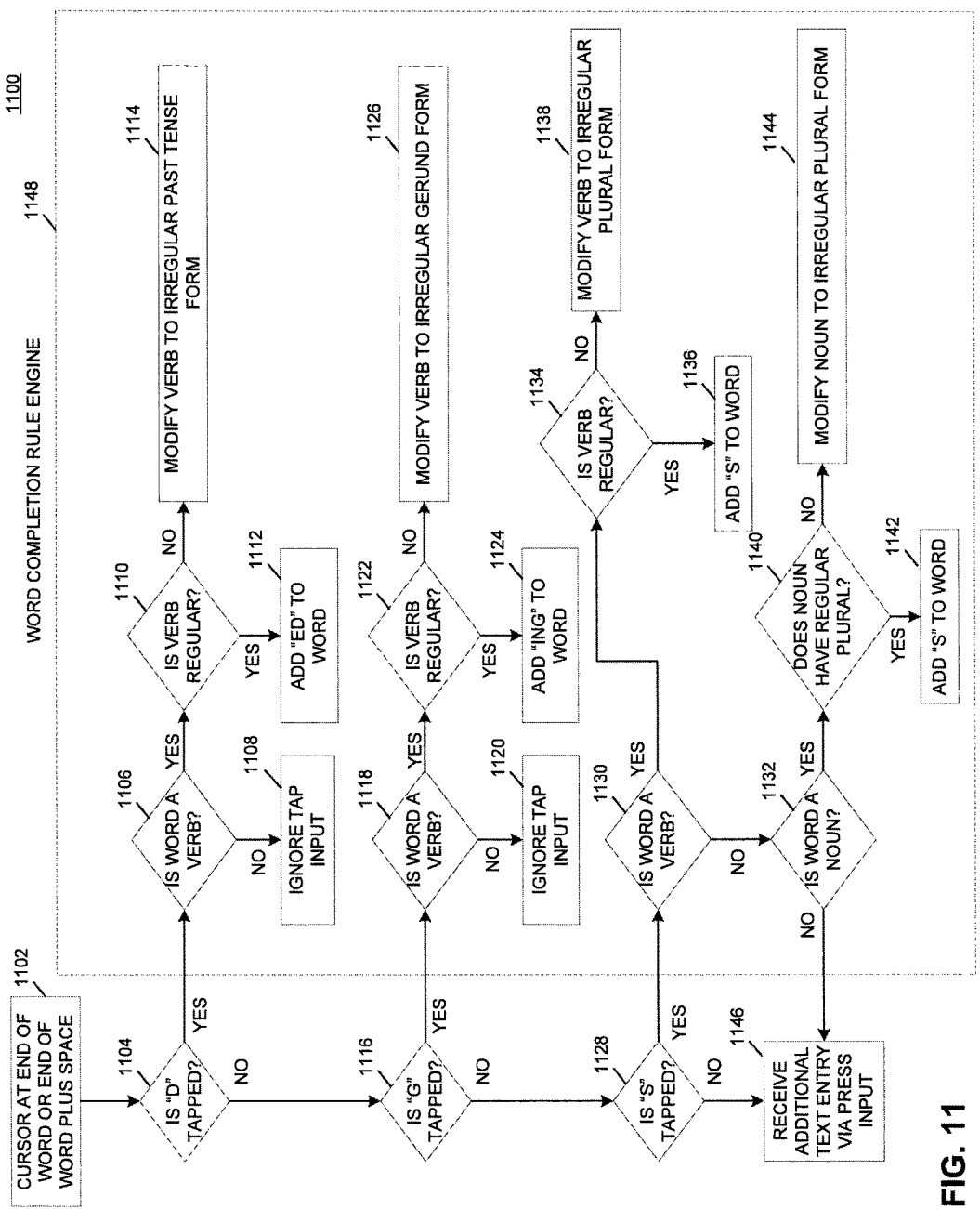

FIG. 11 is a flow chart showing a word completion rule process 1100, consistent with example embodiments disclosed herein. Initially, cursor 240 is located at the end of an entered word, or at the end of an entered word plus a space (Step 1102). In this example, if the "D" key is tapped on keyboard 220 (Step 1104: YES), then processor 102 enters word completion rule engine 1148. Word completion rule engine 1148 may be a program 148 stored in memory 110. Word completion rule engine 1148 applies word completion rules described above in association with FIGS. 7-10.

Word completion rule engine 1148 determines if the word desired to be modified with the "D" key is a verb (Step 1106). If the word is not a verb (Step 1106: NO), then the tap input of the "D" key is ignored (Step 1108). If the word is a verb (Step 1106: YES), then word completion rule engine 1148 determines if the verb is a "regular" verb under the rules of grammar (Step 1110). If the verb is a regular verb (Step 1110: YES), the suffix "-ed" is added to the end of the inputted word (Step 1112). If the verb is not a regular verb (Step 1110: NO), the verb is then modified to its irregular past tense form which word completion rule engine 1148 has previously determined, for example as part of word completion rule process 1000 (Step 1114).

If the "D" key was not tapped (Step 1104: NO), then in this example processor 102 next determines whether the "G" key was tapped on keyboard 220 (Step 1116). In this example, if the "G" key is tapped on keyboard 220 (Step 1116: YES), then processor 102 enters word completion rule engine 1148. Word completion rule engine 1148 determines if the word desired to be modified with the "G" key is a verb (Step 1118). If the word is not a verb (Step 1118: NO), then the tap input of the "G" key is ignored (Step 1120). If the word is a verb (Step 1118: YES), then word completion rule engine 1148 determines if the verb is a "regular" verb under the rules of grammar (Step 1122). If the verb is a regular verb (Step 1122: YES), the suffix "-ing" is added to the end of the inputted word (Step 1124). If the verb is not a regular verb (Step 1122: NO), the verb is then modified to its irregular gerund form which word completion rule engine 1148 has previously determined, for example as part of word completion rule process 1000 (Step 1126).

If the "G" key was also not tapped (Step 1116: NO), then in this example processor 102 next determines whether the "S" key was tapped on keyboard 220 (Step 1128). In this example, if the "S" key is tapped on keyboard 220 (Step 1128: YES), then processor 102 enters word completion rule engine 1148. Word completion rule engine 1148 determines if the word desired to be modified with the "S" key is a verb (Step 1130). If the word is not a verb (Step 1130: NO), then word completion rule engine 1148 determines if the word is a noun (Step 1132). If the word is neither a verb nor a noun (Step 1132: NO) then electronic device 100 continues in normal operation to receive additional text input via key presses or other typical means of input (Step 1146).

If the word desired to be modified with a tap input on the "S" key is a verb (Step 1130: YES), then word completion rule engine 1148 determines if the verb is a "regular" verb under the rules of grammar (Step 1134). If the verb is a regular verb (Step 1134: YES), the suffix "-ing" is added to the end of the inputted word (Step 1124). If the verb is not a regular verb (Step 1134: NO), the verb is then modified to its irregular plural form which word completion rule engine 1148 has previously determined, for example as part of word completion rule process 1000 (Step 1138).

If the word desired to be modified with a tap input on the "S" key is a noun (Step 1132: YES), then word completion rule engine 1148 determines if the noun has a "regular" plural form under the rules of grammar (Step 1140). If the noun has a regular plural form (Step 1140: YES), then the suffix "-s" is added to the end of the inputted word (Step 1142). If the noun does not have a regular plural form (Step 1140: NO), the noun is then modified to its irregular plural form which word completion rule engine 1148 has previously determined, for example as part of word completion rule process 1000 (Step 1144). If none of the "shortcut" keys, such as the "D", "G", or "S" keys in this example, are tapped after a word has been input, electronic device 100 continues to receive input of additional characters via key press inputs (Step 1146).

The disclosed methods and apparatuses facilitate improved character entry via electronic device 100 by reducing the time needed to complete words. Additionally, the disclosed methods and apparatuses add value for users because the word completion of irregular words in this method ensures accuracy in the word completion, particularly for words with irregular forms.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The terms "electronic device" and "data processing apparatus" encompass all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, non-transitory form, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIGS. 7-11) can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for operating an electronic device having a display and a keyboard, comprising:
    receiving a first user input of a predicted candidate from a plurality of predicted candidates;
    displaying the predicted candidate and a cursor in a viewing pane of the display, wherein the cursor is displayed at a position adjacent to an end of the predicted candidate;
    receiving a second user input to modify the displayed predicted candidate via the keyboard while displaying the cursor at the position adjacent to the end of the predicted candidate, wherein the second user input is a tap on one of a plurality of keys of the keyboard, and wherein tapping touches a tapped key without engaging a physical or electronic dome switch associated with the tapped key; and
    in response to receiving the second user input:
        determining that the first and second inputs are both associated with a word completion rule, wherein the word completion rule is selected from a set of word completion rules and each word completion rule defines a variant associated with a particular user input, and wherein the selection of the word completion rule is based on at least the key on which the second user tap input is received;
        in accordance with the word completion rule, modifying the predicted candidate displayed in the viewing pane; and
        replacing the displayed predicted candidate with the modified predicted candidate in the viewing pane.

2. The method of claim 1, further comprising:
    generating a list of word completion rules based on rules of spelling.

3. The method of claim 1, further comprising:
    generating a list of word completion rules based on rules of grammar.

4. The method of claim 1, wherein receiving a second user input via the keyboard comprises receiving input from a single key of the keyboard.

5. The method of claim 4, wherein receiving input from a single key of the keyboard comprises receiving input of a particular key of the keyboard when the user desires to add a prefix to the inputted word.

6. The method of claim 4, wherein receiving input from a single key of the keyboard comprises receiving input of a particular key of the keyboard when the user desires to add a suffix to the inputted word.

7. The method of claim 1, wherein receiving a second user input via the keyboard comprises a tap on one of the plurality of keys of the keyboard.

8. The method of claim 1, wherein modifying the committed prediction to reflect application of the word completion rule comprises removing a prefix or suffix from the inputted word.

9. The method of claim 1, further comprising:
    generating a set of word predictions associated with the inputted characters;
    receiving a selection of one of the predictions; and
    displaying the selected prediction on the display.

10. An electronic device having a display and a keyboard, comprising:
    a memory containing instructions; and
    one or more processors configured to execute the instructions to:
        receive a first user input of a predicted candidate from a plurality of predicted candidates;
        display the predicted candidate and a cursor in a viewing pane of the display, wherein the cursor is displayed at a position adjacent to an end of the predicted candidate;
        receive a second user input to modify the displayed predicted candidate via the keyboard while displaying the cursor at the position adjacent to the end of the predicted candidate, wherein the second user input is a tap on one of a plurality of keys of the keyboard, and wherein tapping touches a tapped key without engaging a physical or electronic dome switch associated with the tapped key; and
        in response to receiving the second user input:

determine that the first and second inputs are both associated with a word completion rule, wherein the word completion rule is selected from a set of word completion rules and each word completion rule defines a variant associated with a particular user input, and wherein the selection of the word completion rule is based on at least the key on which the second user tap input is received;

in accordance with the word completion rule, modify the predicted candidate displayed in the viewing pane; and replace the displayed predicted candidate with the modified predicted candidate in the viewing pane.

11. The electronic device of claim 10, wherein the one or more processors are further configured to:
generate a list of word completion rules based on rules of spelling.

12. The electronic device of claim 10, wherein the one or more processors are further configured to:
generate a list of word completion rules based on rules of grammar.

13. The electronic device of claim 10, wherein the second user input is associated with a single key of the keyboard.

14. The electronic device of claim 13, wherein the single key is a particular key of the keyboard when the user desires to add a prefix to the inputted word.

15. The electronic device of claim 13, wherein the single key is a particular key of the keyboard when the user desires to add a suffix to the inputted word.

16. The electronic device of claim 10, wherein the second user input comprises a tap on one of the plurality of keys of the keyboard.

17. The electronic device of claim 10, wherein the second user input serves to remove a prefix or suffix from the inputted word.

18. The electronic device of claim 10, wherein the one or more processors are further configured to:
generate a set of word predictions associated with the inputted characters;
receive a selection of one of the predictions; and
display the selected prediction on the display.

* * * * *